(12) United States Patent
Church

(10) Patent No.: US 6,695,185 B2
(45) Date of Patent: Feb. 24, 2004

(54) VEHICLE EQUIPMENT RACK

(76) Inventor: John D. Church, 10 Breckenridge La., Savannah, GA (US) 31411

( * ) Notice: Subject to any disclaimer, the term of this patent is extended or adjusted under 35 U.S.C. 154(b) by 0 days.

(21) Appl. No.: 10/198,180

(22) Filed: Jul. 19, 2002

(65) Prior Publication Data

US 2004/0011838 A1 Jan. 22, 2004

(51) Int. Cl.[7] ................................................. B60R 9/00
(52) U.S. Cl. ...................... 224/521; 224/523; 224/532; 224/533; 224/536; 224/924
(58) Field of Search .................. 224/501, 504, 224/505, 506, 507, 508, 519, 520, 521, 522, 523, 525, 531, 532, 533, 536, 924

(56) References Cited

U.S. PATENT DOCUMENTS

| | | | |
|---|---|---|---|
| 3,610,658 A | | 10/1971 | Sartori |
| 3,757,975 A | * | 9/1973 | Sneider ..................... 414/462 |
| 4,971,237 A | * | 11/1990 | Davis ......................... 224/506 |
| 5,526,971 A | | 6/1996 | Despain |
| 5,615,904 A | | 4/1997 | Van Dusen et al. |
| 5,862,966 A | | 1/1999 | Mehls |
| 6,039,228 A | * | 3/2000 | Stein et al. .................. 224/532 |
| 6,062,451 A | | 5/2000 | Lassankse et al. |
| 6,129,371 A | * | 10/2000 | Powell ..................... 280/461.1 |
| 6,336,580 B1 | * | 1/2002 | Allen et al. .................. 224/532 |
| 6,401,999 B1 | * | 6/2002 | Hehr ........................... 224/502 |
| 2002/0050502 A1 | * | 5/2002 | Jeong ......................... 224/506 |

* cited by examiner

Primary Examiner—Stephen K. Cronin
(74) Attorney, Agent, or Firm—Birch, Stewart, Kolasch & Birch, LLP

(57) ABSTRACT

A vehicle equipment rack for being removably attached to a vehicle rear hitch includes a carrier having a generally question-mark shape. The carrier has a substantially-vertical rigid carrier post assembly with a rigid extension arm connected to the carrier post assembly extending first in a diagonal direction toward the rear of the vehicle and then outwardly away from the rear of the vehicle to an outer end portion of the extension arm where it is connected to an attachment assembly. In one embodiment there are multiple carriers, with the post assemble of each carrier being rigidly linked to a laterally-extending cross bar that has a common post assembly for rigidly linking the multiple carriers to the hitch member. The laterally-extending cross bar extends diagonal to the horizontal so that adjacent carriers are positioned at different levels.

10 Claims, 3 Drawing Sheets

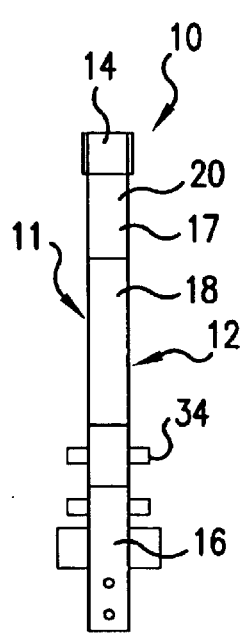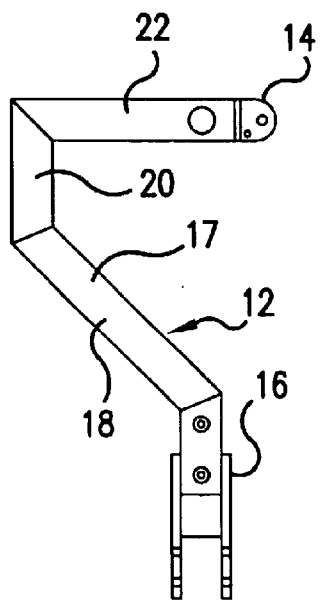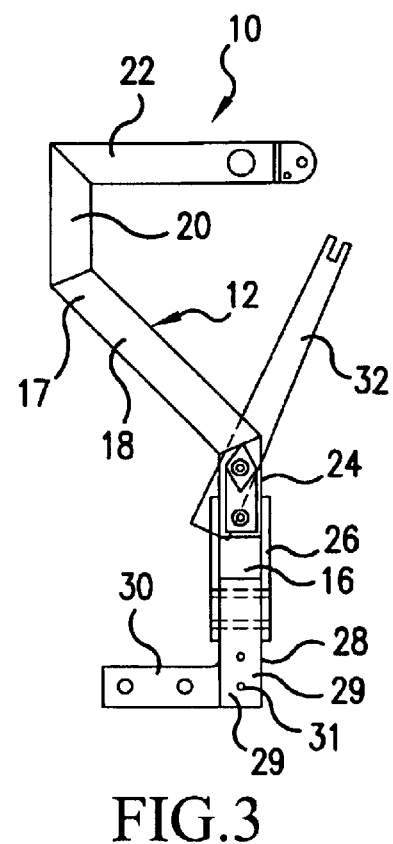
FIG.1  FIG.2  FIG.3
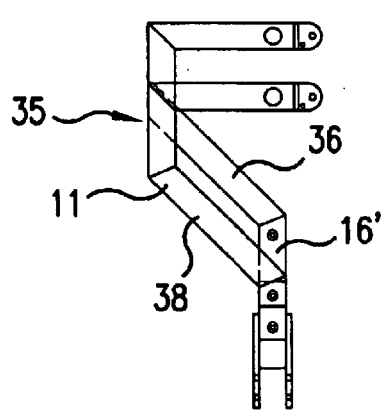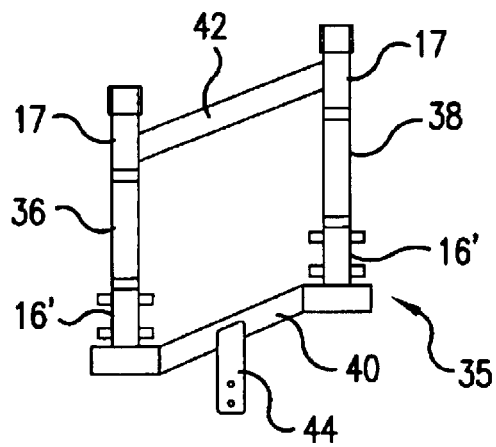
FIG.4  FIG.5

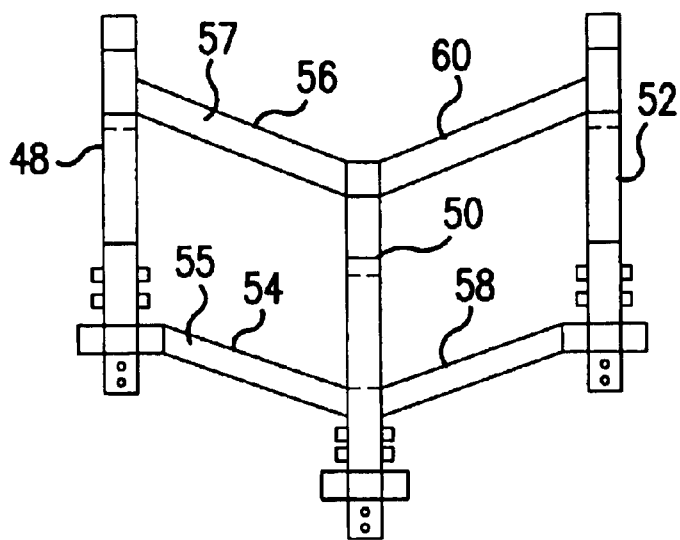 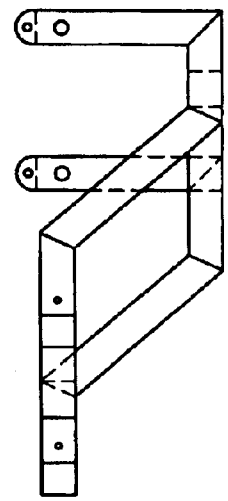
FIG.10  FIG.11
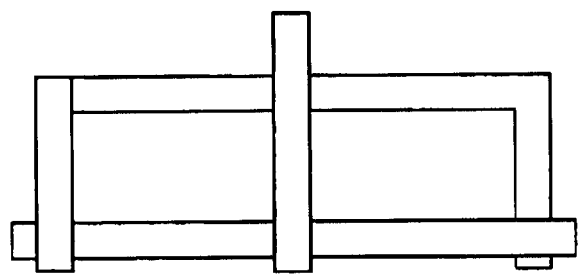
FIG.12

VEHICLE EQUIPMENT RACK

BACKGROUND OF THE INVENTION

This invention relates generally to vehicle racks, and more specifically to universal rear-mounted vehicle racks normally used for hauling sports equipment such as bicycles, snowboards, skis, surfboards etc., especially bicycles.

There are many types of rear-mounted vehicle racks available in the prior art, as are represented generally by U.S. Pat. No. 3,610,658 to Sartori; U.S. Pat. No. 5,615,904 to Van Dusen et al., U.S. Pat. No. 5,526,971 to Despain; U.S. Pat. No. 5,862,966 to Mehls; and U.S. Pat. No. 6,062,451 to Lassanske et al.

Many such prior-art vehicle rear-mounted utility racks are not well balanced, with the weights of carried objects causing excessive bounce. Similarly, some of such racks and their cargo extend so far rearwardly that they present a hazard and, in some cases, even violate local codes. Further, it is difficult to mount multiple items, such as bicycles, on some prior-art vehicle rear-mounted utility racks. Similarly, some such racks allow multiple items mounted thereon to make undue contact, and possibly damage, one another. Conversely, some prior-art vehicle rear-mounted utility racks do not allow mounting of multiple items thereon at all.

Accordingly, it is an object of this invention to provide a vehicle rear-mount equipment rack that is relatively well balanced, does not extend unduly to the rear, allows relatively easy mounting of multiple items while minimizing contact between them and is not unduly complicated in structure.

SUMMARY OF THE INVENTION

According to principles of this invention, a vehicle equipment rack for being removably attached to a rear hitch of a vehicle includes at least one carrier having a generally question-mark shape, the carrier including a substantially-vertical rigid carrier post assembly with a rigid extension arm connected to the carrier post assembly extending first toward the rear of the vehicle and then outwardly away from the rear of the vehicle to an outer end portion of the extension arm, where there is an attachment assembly connected to an outer free end of the extension arm.

In an embodiment with only one carrier, the carrier post assembly is divided into three separate posts, an upper post, a middle post, and a lower post, with the upper and lower posts inter-engaging with (telescoping and bolted with) the middle post, and the lower post being mounted on the hitch member. The lower post is attached to the hitch member in such a way that it can be selectively rotated thereon. The upper post can be formed as one member with the rigid extension arm and the lower post can include lateral plates for straddling and being attached to the hitch member.

In another embodiment with multiple carriers, the carrier post assembly of each carrier is rigidly linked to a laterally-extending cross bar that has a common post assembly for rigidly linking the multiple carriers to the hitch member. Thus, in this embodiment, at least one of the carriers is attached to the laterally-extending cross bar at a point laterally displaced from the hitch member. In one such embodiment the laterally-extending cross bar extends diagonal to the horizontal so that one of the multiple carriers is positioned lower than another. In each of the multiple-carrier embodiments described herein, there are upper and lower laterally-extending cross bars to form a cross bar set.

In an embodiment having three carriers rigidly attached to one cross bar set, each laterally-extending cross bar of the cross bar set forms a V-shape when mounted on a vehicle and viewed in elevation from the rear of the vehicle.

BRIEF DESCRIPTION OF THE DRAWINGS

Further benefits, characteristics and details of the invention are explained in more detail below using embodiments shown in the drawings. The described and drawn features can be used individually or in preferred combinations in other embodiments of the invention. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a rear view of a first embodiment, single-carrier, vehicle equipment rack of this invention;

FIG. 2 is a side view of the vehicle equipment rack of FIG. 1;

FIG. 3 is a view similar to FIG. 2, but with a tire mount and the carrier post assembly thereof including a lower-post for rigidly linking the carrier post assembly directly to a hitch member, with the hitch member also being shown;

FIGS. 4, 5 and 6 are respectively side and rear elevations, and a top view of a second-embodiment, double-carrier equipment rack of this invention;

FIGS. 10–12 are respectively rear and side elevations and a top view of a third-embodiment, triple-carrier, vehicle equipment rack of this invention.

DETAILED DESCRIPTION OF THE PREFERRED EMBODIMENTS

Figure 7:
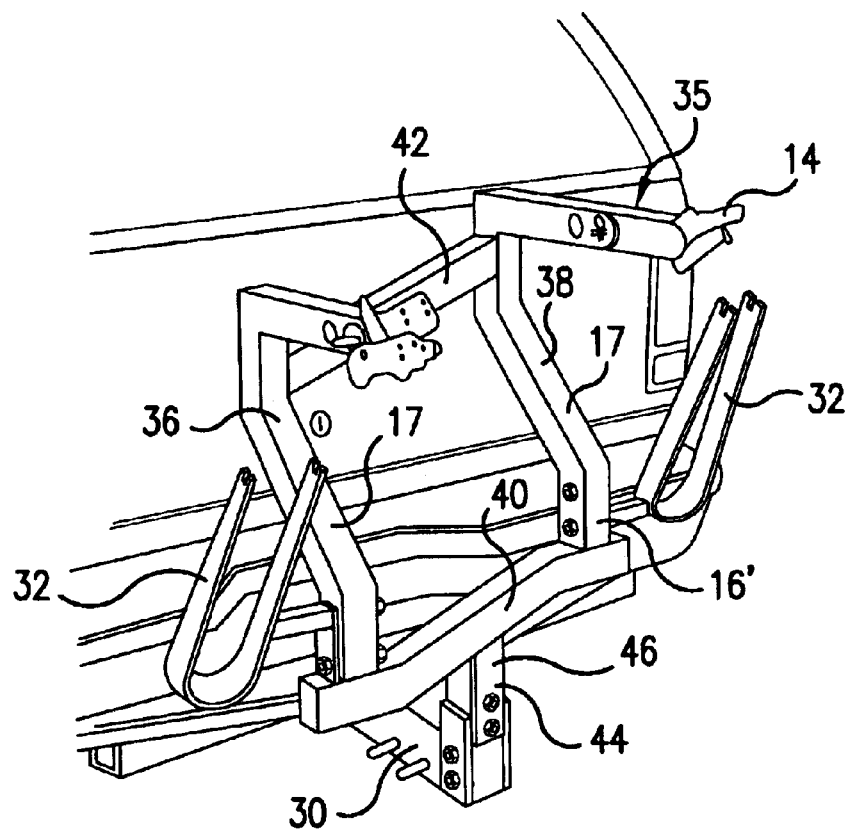
FIG. 7 is an isometric view of the double-carrier equipment rack of FIGS. 4–6 mounted on a rear of a vehicle with tire mounts shown therewith.

A first-embodiment single-carrier vehicle equipment rack 10 of this invention is depicted in FIGS. 1–3. The vehicle equipment rack 10 is constructed of steel as a single rigid carrier 12 with an attachment assembly 14 that is mounted at a free end, or outer portion, of the single rigid carrier 12 for attaching to an item to be carried by the vehicle equipment rack 10.

The single rigid carrier member 12 includes a rigid, substantially-vertical, carrier post assembly 16 and an extension arm 17 rigidly connected to an upper portion of the carrier post assembly 16. The extension arm 17 has a first extension-arm portion 18 extending diagonally toward the rear of a vehicle when the vehicle equipment rack is mounted on the vehicle, a second extension-arm portion 20 extending substantially vertically, and a third extension-arm portion 22 extending horizontally away from the rear of the vehicle, so that the carrier (the carrier post assembly 16, the extension arm 17 and the attachment assembly 14) basically forms a question-mark shape. In this regard, it is not necessary that the extension arm be configured as straight-line segments as depicted in FIGS. 1–3, but rather could have a more curved shape.

In the embodiment shown in FIGS. 1–3, as can be most clearly seen in FIG. 1, the carrier post assembly 16 and the extension arm 17 have a generally rectangular, or square, cross section.

FIG. 3 depicts the single-carrier vehicle equipment rack of FIGS. 1–3 with its carrier post assembly 16 actually being formed of an upper post 24, a middle post 26, and a lower post 28, with the upper and lower posts, 24 and 28 telescoping into the middle post 26 and being attached thereto by bolts. In fact, all of these members are rigidly attached to one another by bolts or welding. The lower post 28 includes two spaced lateral plates 29, which are attached to opposite sides of a vehicle hitch member 30 by pins 31. By removing one of the pins 31, the vehicle equipment rack 10 can be pivoted downwardly, away from a vehicle.

Figure 6:
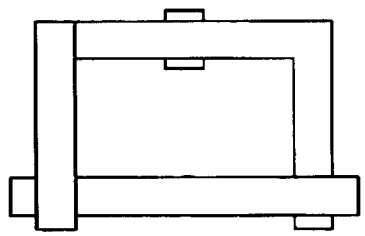

Although the first-embodiment, single-carrier vehicle equipment rack 10 is not shown mounted on a vehicle, its orientation to a vehicle when it is mounted is similar to that of a second-embodiment, double-carrier vehicle equipment rack shown in FIG. 6; that is, as mentioned above, the diagonal first extension-arm portion 18 extends backwardly toward the vehicle.

FIG. 3 depicts a tire mount 32 that is attached to the upper post 24 of the carrier post assembly 16 for holding a front tire of a bicycle mounted on the attachment assembly 14. In this regard, when the attachment assembly 14 attaches to a crossbar of a bicycle, pins 34 on the upper post 24 hold the front fork, from which the front tire of the bicycle was removed. For the single carrier vehicle equipment rack there need only be one tire mount 32.

FIGS. 4–7 depict a second-embodiment double-carrier vehicle equipment rack 35 of this invention, in which there are first and second carriers 36 and 38, each including an extension arm 17 and a carrier post assembly 16'. In this embodiment, there are further included laterally-extending lower and upper cross bars 40 and 42 and a common post assembly 44. When this embodiment is mounted on a hitch member of a vehicle, the common post assembly 44 includes a middle post, which is attached to a lower post, which, in turn, is attached to a vehicle hitch member 30 in the manner shown for the single-carrier vehicle equipment rack 10 of FIG. 3.

It should be noted that in the FIGS. 4–7 embodiment the laterally-extending lower and upper cross bars 40 and 42 have a diagonal orientation to a horizontal plane that offsets the first and second carriers 36 and 38 from one another vertically as well as horizontally. In this manner, bicycles and other equipment attached to the first and second carriers 36 and 38 are offset from one another in two dimensions so that, in the case of bicycles for example, the pedals, handlebars, and the like do not normally make undue contact with one another.

An isometric view of the second embodiment is shown in FIG. 7 along with two tire mounts 32, one for each carrier. In the embodiment shown in FIG. 7, there are only an upper and a lower post forming the common post assembly 44.

Figure 8:
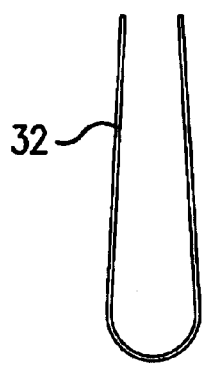
FIGS. 8 and 9 are respectively front and side elevations of the tire mount of FIG. 7.
Figure 9:
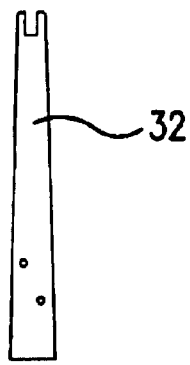

FIGS. 8 and 9 depict the tire mounts 32 individually in more detail.

FIGS. 10–12 depict a third embodiment of this invention in which there are first, second and third carriers 48, 50 and 52. In this embodiment, the second carrier 50, which is positioned between the first and third carriers 48 and 52, is basically the same as the single-carrier vehicle equipment rack of FIGS. 1–3. However, in addition, there are left and right laterally-extending lower and upper cross bars 54 and 56. As can be seen in FIG. 10, left lower and upper cross bar portions 55 and 57 extend diagonally, leftward, upwardly from the second carrier 50 for attaching the first carrier 48 to the second carrier 50. Similarly, the lower and upper cross bar portions 58 and 60 extend diagonally, rightward, upwardly from the second carrier 50 for attaching the third carrier 52 to the second carrier 50. As can be seen, the first and third carriers are offset vertically as well as horizontally from the second carrier 50 while the first and third carriers are positioned at the same level by this V-shaped cross bar arrangement. Thus, adjacent bicycles, or other equipment, held by the triple-carrier vehicle equipment rack of FIGS. 10–12 are offset in two dimensions from one another.

It will be understood by those of ordinary skill in the art that all embodiments of the rack of this invention offer great improvements over racks of the prior-art. In this respect, the question-mark shape of this rack improves the balance of the rack because it places much of the weight of items being held by the rack above the carrier and common post assemblies, both for the single-carrier and multiple-carrier racks, as the case may be.

In addition, the substantially-vertical carrier post assembly and common post assembly (in the case of a multiple-carrier vehicle equipment rack), in combination with the vehicle-directed diagonal first extension-arm portion 18, not only ensure that the item held by the vehicle equipment rack does not unduly protrude rearward from the vehicle, but also allows the first extension-arm portion 18 to protrude diagonally forwardly, toward the vehicle, without encountering vehicle structure. The third extension-arm portion 22, in combination with the second extension-arm portion 20, supports the attachment assembly 14 at a position for conveniently attaching to an item to be held, such a bicycle cross bar, substantially vertically above the main support structure, namely the carrier and common post assemblies.

The tire mounts 32 allow one to carry the tires of bicycles with the vehicle equipment rack so that front forks of the bicycles can be attached to pins on the carrier post assemblies. In this regard, a bicycle is normally transported by a rack of this invention with its front facing downwardly toward the street and its rear tire directed upwardly.

Yet another benefit of this invention is that multiple bicycles mounted on the vehicle equipment rack are vertically staggered so that their components do not interfere with one another by the diagonal configuration of the laterally-extending cross bars.

Although the invention has been described with reference to particular embodiments, it will be understood by those of ordinary skill in the art that other combinations are possible within the scope of the invention. For example, as previously mentioned, it is not necessary that the extension arms 17 be formed of linear extension-arm segments as depicted in FIG. 2, rather, its form could be more curved to have a more curved question-mark shape. Also, in one multiple carrier embodiment, there is no common post assembly; rather the lateral cross bar is attached directly to the vehicle hitch member. Conversely, In another multiple carrier embodiment, there are no carrier post assemblies, rather, a common post assembly provides a necessary vertical positioning and the carrier extension arms are connected directly to the cross bar.

I claim:

1. A vehicle equipment rack for being removably attached to a vehicle via a hitch member extending horizontally from a rear of said vehicle, said vehicle equipment rack comprising at least one carrier, said at least one carrier including:

a substantially-vertical rigid carrier post assembly for being rigidly linked to said hitch member and extending substantially vertically therefrom;

a rigid extension arm rigidly attached to said carrier post assembly, said rigid extension arm including a first extension-arm portion attached to said carrier post assembly and extending from said carrier post assembly diagonally toward said rear of said vehicle when said vehicle equipment rack is mounted on said vehicle and then extending outwardly away from said rear of said vehicle to an outer end portion of said extension arm, whereby said carrier generally forms a question-mark shape when viewed from a side of said vehicle; and an attachment assembly mounted on said outer-end portion of said extension arm for receiving an equipment carrier attachment.

2. The vehicle equipment rack as in claim 1, wherein said carrier post assembly is divided into at least an upper post and a lower post, with the upper post being rigidly attached to the extension arm.

3. The vehicle equipment rack as in claim 2, wherein said carrier post assembly further comprises a middle post between the upper and lower posts, said lower post being attachable to the hitch member in a manner such that the vehicle equipment rack can be selectively rotated on the hitch member.

4. The vehicle equipment rack as in claim 1, wherein there are at least first and second carriers, and wherein is further included a laterally-extending cross bar and a common post assembly rigidly attached to said laterally-extending cross bar, and wherein the carrier post assembly of each of the carriers is attached to the laterally-extending cross bar so that the carriers are laterally displaced from one another along the cross bar, and wherein the common post assembly is for attaching the vehicle equipment rack to said hitch member.

5. The vehicle equipment rack as in claim 4, wherein the common post assembly is divided into at least an upper post and a lower post, with the upper post being rigidly attached to the laterally-extending cross bar.

6. The vehicle equipment rack of claim 4, wherein there are only two carriers attached to said cross bar.

7. The vehicle equipment racks as in claim 4, wherein there are two cross bars, an upper cross bar and a lower cross bar.

8. The vehicle equipment rack as in claim 4, wherein said cross bar has a configuration diagonal to the horizontal when viewed from a rear of the vehicle on which said vehicle equipment rack is mounted with a portion of said cross bar at which said first carrier is mounted being lower than a portion of said cross bar at which said second carrier is mounted so that said first and second carriers are supported by said cross bar at different levels.

9. A vehicle equipment rack as in claim 4, wherein there are at least first, second and third carriers, and wherein said cross bar has a V-shape, with said first and third carriers being mounted at ends of the V and said second carrier being mounted at the apex of said V so that said first and third carriers are approximately at the same level and said second carrier is at a substantially different level.

10. The vehicle equipment rack of claim 9, wherein there are two cross bars, an upper and a lower cross bar.

* * * * *